United States Patent
Kim et al.

(10) Patent No.: US 10,824,257 B2
(45) Date of Patent: Nov. 3, 2020

(54) ELECTRONIC DEVICE

(71) Applicant: Samsung Display Co., Ltd., Yongin-si (KR)

(72) Inventors: Hyungchul Kim, Hwaseong-si (KR); Mi-hee Son, Chungju-si (KR); Youngseok Yoo, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/668,206

(22) Filed: Aug. 3, 2017

(65) Prior Publication Data

US 2018/0120988 A1 May 3, 2018

(30) Foreign Application Priority Data

Oct. 27, 2016 (KR) .................. 10-2016-0141421

(51) Int. Cl.
*G06F 3/044* (2006.01)
*G06F 3/041* (2006.01)
*G09G 5/00* (2006.01)

(52) U.S. Cl.
CPC .......... *G06F 3/0412* (2013.01); *G06F 3/0418* (2013.01); *G09G 5/003* (2013.01); *G06F 3/044* (2013.01); *G06F 2203/04107* (2013.01); *G06F 2203/04111* (2013.01)

(58) Field of Classification Search
CPC .............................. G06F 3/044; G06F 3/0412
See application file for complete search history.

(56) References Cited

U.S. PATENT DOCUMENTS

| | | |
|---|---|---|
| 2007/0222766 A1 | 9/2007 | Bolender |
| 2015/0009428 A1* | 1/2015 | Nakayama .............. G06F 3/044 349/12 |
| 2016/0077645 A1 | 3/2016 | Chien et al. |
| 2016/0162071 A1 | 6/2016 | Yeh et al. |
| 2016/0170523 A1 | 6/2016 | Park et al. |

(Continued)

FOREIGN PATENT DOCUMENTS

| | | |
|---|---|---|
| KR | 10-1056312 | 8/2011 |
| KR | 10-2015-0070664 | 5/2015 |
| KR | 10-2016-0072909 | 6/2016 |

(Continued)

OTHER PUBLICATIONS

Application Note AN3960, "ESD considerations for touch sensing applications on MCUs," STMicroelectronics, May 20, 2016.

(Continued)

*Primary Examiner* — Hang Lin
(74) *Attorney, Agent, or Firm* — H.C. Park & Associates

(57) ABSTRACT

Provided is an electronic device. The electronic device includes a base layer including a sensing area and a surrounding area configured to surround the sensing area, a plurality of sensor patterns disposed on the sensing area, and connection patterns connecting the plurality of sensor patterns to each other. A boundary between the sensing area and the surrounding area comprises a curved boundary, and the connection pattern, which is disposed adjacent to the curved boundary, of the connection patterns is disposed to be spaced a predetermined distance or more from the curved boundary.

20 Claims, 15 Drawing Sheets

(56) References Cited

U.S. PATENT DOCUMENTS

2016/0210893 A1 7/2016 Lee
2016/0239131 A1* 8/2016 Kang .................. G06F 3/044

FOREIGN PATENT DOCUMENTS

| KR | 20-2016-0002040 | 6/2016 |
| KR | 10-2016-0089559 | 7/2016 |
| KR | 10-1686092 | 12/2016 |

OTHER PUBLICATIONS

European Search Report dated Mar. 6, 2018, in European Patent Application No. 17197018.9-1231.

* cited by examiner

ELECTRONIC DEVICE

CROSS-REFERENCE TO RELATED APPLICATION

This application claims priority from and the benefit of Korean Patent Application No. 10-2016-0141421, filed on Oct. 27, 2016, which is hereby incorporated by reference for all purposes as if fully set forth herein.

BACKGROUND

Field

Exemplary embodiments relate to an electronic device. More particularly, exemplary embodiments relate to an electronic device having improved reliability.

Discussion of the Background

An electronic device includes an active area that is activated according to an electrical signal. The electronic device detects touch that is applied from the outside through the active area and simultaneously displays various images to provide information to a user. In recent years, electronic devices having various shapes, with active areas of various shapes, have been developed.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide an electronic device having improved reliability.

Additional aspects will be set forth in the detailed description which follows, and, in part, will be apparent from the disclosure, or may be learned by practice of the inventive concept.

Exemplary embodiments provide an electronic device including a base layer including a first area, a second area outside the first area, and a third area outside the second area, and a sensor including a plurality of sensor patterns disposed on the first and second areas and a plurality of connection patterns configured to connect the adjacent sensor patterns of the plurality of sensor patterns and the plurality of connection patterns include a central connection pattern disposed on the first area and first to third outer connection patterns disposed on the second area. A center of the first outer connection pattern is disposed to be spaced apart from a center of the central connection pattern in a first direction, a center of the second outer connection pattern is disposed to be spaced apart from the center of the central connection pattern in a second direction, the third outer connection pattern is disposed to be spaced apart from the center of the central connection pattern in a third direction crossing the first and second directions, and a center of the third outer connection pattern does not overlap a first cross point at which a first virtual line extending from the center of the first outer connection pattern in the second direction and a second virtual line extending from the center of the second outer connection pattern in the first direction cross each other.

In another exemplary embodiment of the inventive concept, an electronic device includes a base layer including a sensing area and a surrounding area configured to surround the sensing area, wherein a boundary between the sensing area and the surrounding area includes a curved boundary, a plurality of sensor patterns disposed on the sensing area and arranged in first and second directions, a plurality of driving lines disposed on the surrounding area to connect the sensor patterns, which are adjacent to the boundary, of the plurality of sensor patterns, and a plurality of connection patterns disposed on the sensing area to connect the sensor patterns, which are adjacent to each other, of the plurality of sensor patterns and including first connection patterns arranged to be spaced a first pitch in the first direction and a second pitch in the second direction from each other on a plane and a second connection pattern disposed between the first connection patterns and the curved boundary. The shortest pitch between the second connection pattern and the first connection pattern, which is closest to the second connection pattern, of the first connection patterns is less than each of the first and second pitches.

In another exemplary embodiment of the inventive concept, an electronic device includes a base layer including a sensing area and a surrounding area configured to surround the sensing area, a plurality of sensor patterns disposed on the sensing area, and a plurality of connection patterns disposed on the sensing area to connect the adjacent sensor patterns of the plurality of sensor patterns and arranged in the form of a M by N matrix. M and N are integers greater than 1, a first line passing through a center of the connection patterns, which are disposed at a first-row second-column to a first-row ((N-1)-th)-column, a second line passing through a center of the connection patterns, which are disposed at a (M-th)-row second-column to a (M-th)-row ((N-1)-th)-column, a third line passing through a center of the connection patterns, which are disposed at a second-row first-column to a ((M-1)-th)-row first-column, and a fourth line passing through a center of the connection patterns, which are disposed at a second-row (N-th)-column to a ((M-1)-th)-row (N-th)-column are defined on the sensing area, and a first cross point at which each of the connection patterns, which are disposed at a first-row first-column, a first-row (N-th)-column, a (M-th)-row first column, and a (M-th)-row (N-th)-column, crosses each of the first and third lines, a second cross point at which the first line and the fourth line cross each other, a third cross point at which the second line and the third line cross each other, and a forth cross point at which the second line and the fourth line cross each other do not overlap each other.

The foregoing general description and the following detailed description are exemplary and explanatory and are intended to provide further explanation of the claimed subject matter.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept.

DETAILED DESCRIPTION OF THE ILLUSTRATED EMBODIMENTS

Figure 1:
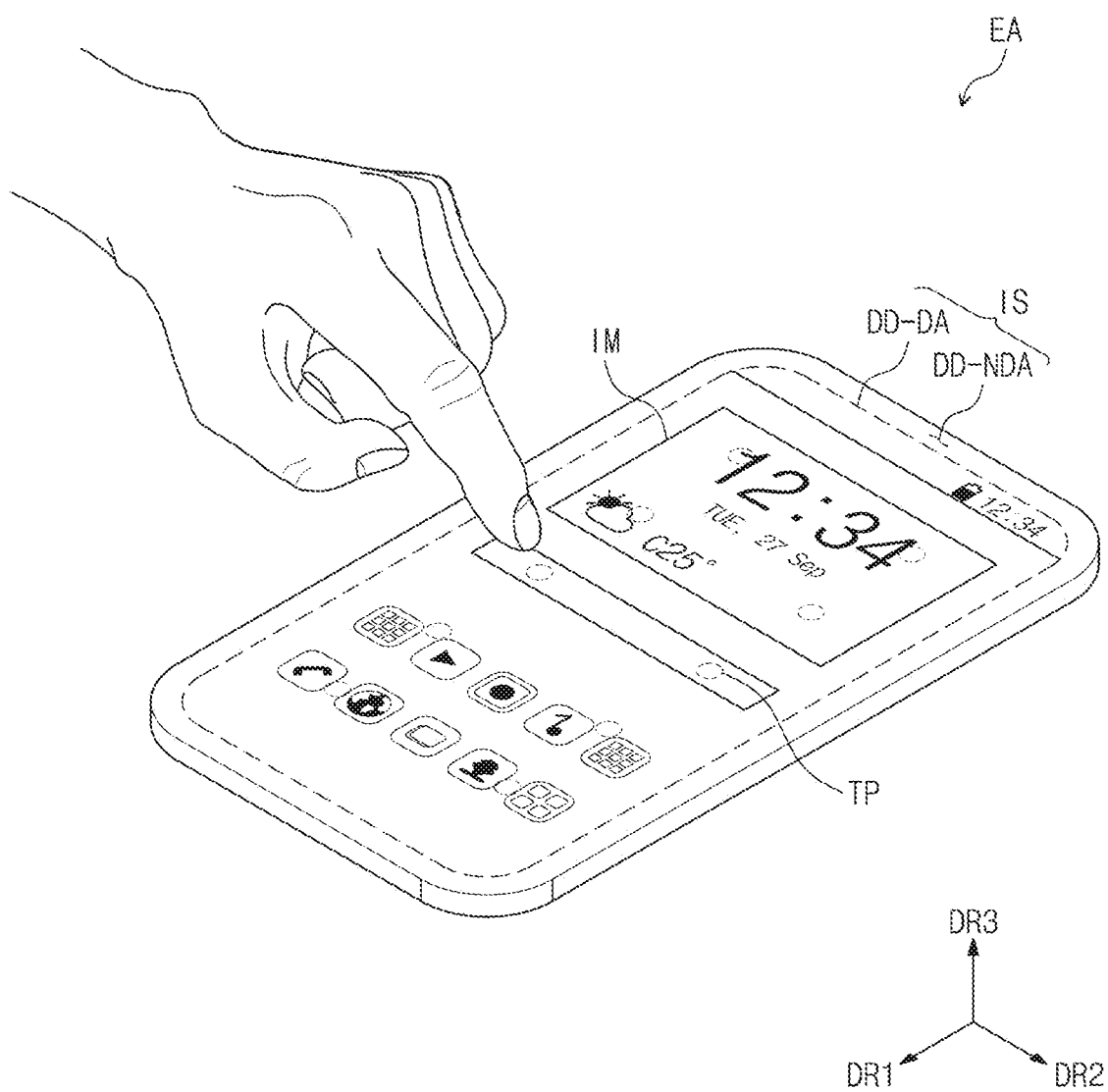
FIG. 1 is a perspective view illustrating a state of use of an electronic device according to an exemplary embodiment of the inventive concept.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a perspective view illustrating a state of use of an electronic device EA according to an exemplary embodiment of the inventive concept.

Referring to FIG. 1, the electronic device EA may be a device for detecting touch that is applied from the outside. The touch applied from the outside may be provided in various manners. FIG. 1 illustrates an exemplary embodiment of detecting a state in which a portion of a human body such as user's hand approaches or contacts the electronic device EA.

However, this state is exemplarily illustrated, and thus, the electronic device EA may detect approach or contact of a portion of an object such as a stylus pen. Also, the electronic device EA may detect touch through various manners including an optical-type, contact-type, thermal sensing-type, or magnetic-type touching manner.

FIG. 1 illustrates a flat electronic device as an example of the electronic device EA. However, the exemplary embodiment of the inventive concept is not limited thereto. For example, the electronic device EA may be applied to various electronic devices such as curved electronic devices, foldable electronic devices, and stretchable electronic devices. Also, the electronic device EA may be used for large-sized electronic devices such as televisions and monitors and small and middle-sized electronic devices such as mobile phones, tablet PC, navigation units for vehicles, game consoles, and smart watches. The above-described equipment is merely exemplary, and thus, the electronic device EA may be adopted for other electronic devices.

The electronic device EA may have a display surface IS on which an image is displayed. The display surface IS may be parallel to a surface defined by a first direction DR1 and a second direction DR2. A normal direction of the display surface IS, i.e., a thickness direction of the electronic device EA may be indicated as a third direction DR3. A front surface (or top surface) and a rear surface (or bottom surface) of each of members may be distinguished by the third direction DR3. However, directions indicated as the first to third direction DR1, DR2, and DR3 may be a relative concept and thus changed into different directions.

The display surface IS of the electronic device EA may include a plurality of areas. The electronic device EA may include a display area DD-DA on which an image IM is displayed and a non-display area DD-NDA that may be adjacent to the display area DD-DA. FIG. 1 illustrates icons of application and watch windows as examples of the image IM displayed on the display area DD-DA. The non-display area DD-NDA may be an area on which an image is not displayed.

The display area DD-DA may have a rectangular shape with four round edges.

Particularly, the display area DD-DA may include four straight sides and four curved sides each of which has a rounded shape and connecting the four straight sides to each other. However, the exemplary embodiment of the inventive concept is not limited thereto. For example, the display area DD-DA may have a rectangular shape with one round edge.

The non-display area DD-NDA may surround the display area DD-DA. However, the exemplary embodiment of the inventive concept is not limited thereto. For example, the display area DD-DA and the non-display area DD-NDA may be designed in a shape relative to each other, or may differ in relative shape.

Figure 2A:
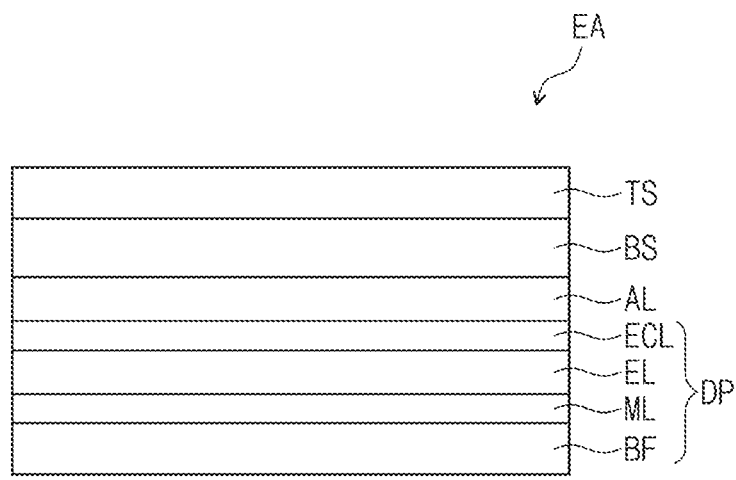
FIG. 2A is a schematic cross-sectional view of the electronic device according to an exemplary embodiment of the inventive concept.

FIG. 2A is a schematic cross-sectional view of the electronic device according to an exemplary embodiment of the inventive concept.

Referring to FIGS. 1 and 2A, the electronic device EA may include a display panel DP, a base layer BS, and a sensor (e.g., a sensor or a touch sensing circuit) TS.

The display panel DP may generate the image IM corresponding to inputted image data. In FIG. 2A, an organic light emitting display panel may be representatively described as an example of the display panel DP. However, the exemplary embodiment of the inventive concept is not limited thereto. For example, the display panel DP may be a liquid crystal display panel, a plasma display panel, or an electrophoretic display panel.

The display panel DP may include a base film BF, a circuit layer ML disposed on the base film BF, a light emitting device layer EL, and a thin film encapsulation layer ECL.

The base film BF may include a plastic substrate, a glass substrate, a metal substrate, and an organic/inorganic composite substrate. The plastic substrate may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, or a perylene-based resin.

The circuit layer ML may include a plurality of insulation layers, a plurality of conductive layers, and a semiconductor layer. A plurality of conductive layers of the circuit layer ML may constitute signal lines or a control circuit of a pixel.

For example, the light emitting device layer EL may include organic light emitting diodes (OLEDs). However, the exemplary embodiment of the inventive concept is not limited thereto. For example, the light emitting device layer EL may include inorganic light emitting diodes or organic-inorganic hybrid light emitting diodes according to a kind of display panel DP.

The thin film encapsulation layer ECL may seal the light emitting device layer EL. The thin film encapsulation layer ECL may include a plurality of inorganic thin films and at least one organic thin film disposed between the inorganic thin films. The inorganic thin films may protect the light emitting device layer EL against moisture and oxygen, and the organic thin film may protect the light emitting device layer EL against foreign substances such as dust particles.

The base layer BS may be disposed on the display panel DP. The base layer BS may include a transparent plastic film. The term "transparent" may mean light transmittance exceeding 0%, and thus may include a translucent state.

The sensor TS may be disposed on the base layer BS. The sensor TS may acquire coordinate information of an external input. Also, the sensor TS may sense a pressure applied from the outside.

The display panel DP and the base layer BS on which the sensor TS is disposed may be coupled to each other by an adhesion member AL. The adhesion member AL may be an organic adhesion layer such as an optically clear adhesive film (OCA), an optically clear resin (OCR), or a pressure sensitive adhesive film (PSA). The organic adhesion layer may include an adhesion material such as a polyurethanebased material, a polyacrylic-based material, a polyester-based material, a polyepoxy-based material, or a polyvinyl acetate-based material.

Figure 2B:
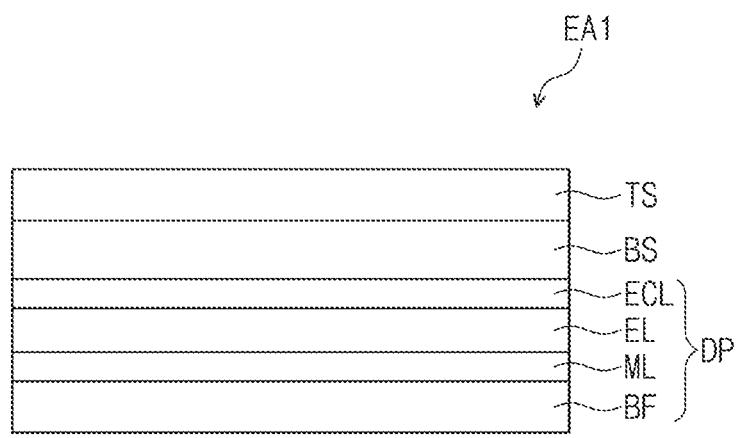
FIG. 2B is a schematic cross-sectional view of the electronic device according to an exemplary embodiment of the inventive concept.

FIG. 2B is a schematic cross-sectional view of the electronic device according to an exemplary embodiment of the inventive concept. In description of FIG. 2B, the same reference numeral may be given to components that are the same as those of FIG. 2A, and their detailed descriptions will be omitted.

Referring to FIG. 2B, the electronic device EA1 may include the display panel DP and the sensor TS. The sensor TS may be directly disposed on the display panel DP. The term "directly disposed" may mean that a component is formed through a continuous process, except that the component may adhere by using a separate adhesion layer.

The base layer BS may be a buffer layer. The buffer layer may be an inorganic layer or an organic layer. The inorganic layer may include at least one of silicon nitride, silicon oxynitride, silicon oxide, titanium oxide, or aluminum oxide. For example, the organic layer may include an acrylic-based organic layer. However, the exemplary embodiment of the inventive concept is not limited thereto. Although the base layer BS is provided as a separate component in FIG. 2B, the base layer BS may be a component of the thin film encapsulation layer ECL.

Figure 3:
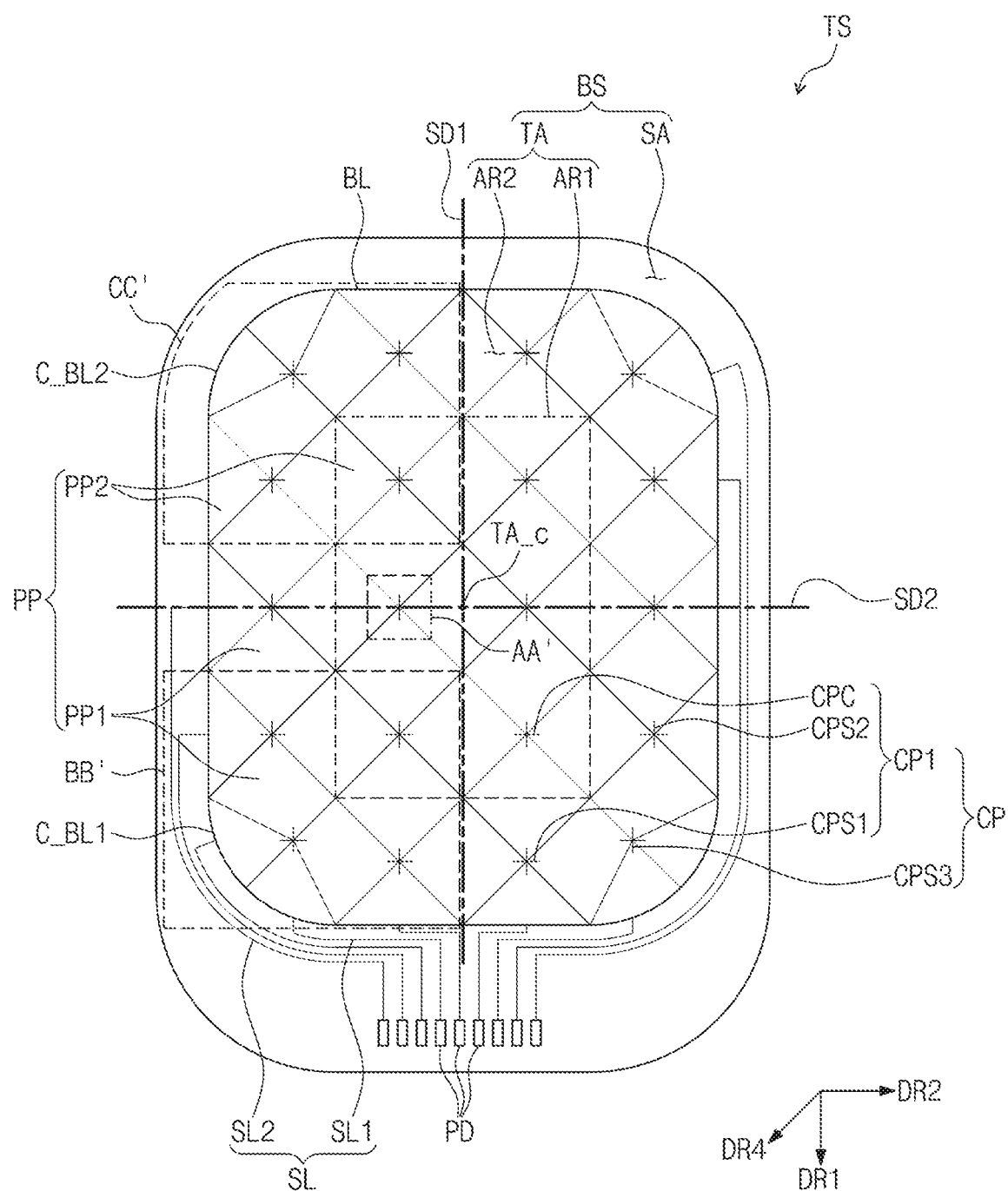
FIG. 3 is a schematic plan view of a sensor according to an exemplary embodiment of the inventive concept.

FIG. 3 is a schematic plan view of the sensor TS according to an exemplary embodiment of the inventive concept.

Referring to FIGS. 2A and 3, the base layer BS may include a first area AR1, a second area AR2 outside the first area AR1, and a third area SA outside the second area AR2. The second area AR2 may surround the first area AR1, and the third area SA may surround the second area AR2. That is, the second area AR2 may be disposed between the first area AR1 and the third area SA. The first area AR1 and the second area AR2 may be called a sensing area TA, and the third area SA may be called a surrounding area SA.

The sensor TS may include a plurality of sensor patterns PP, connection patterns CP, a plurality of driving lines SL, and a pad part PD.

The plurality of sensor patterns PP and the plurality of connection patterns CP may be disposed on the sensing area TA. The sensing area TA may be defined as an area surrounded by a boundary BL between an area on which the sensor patterns PP and the plurality of connection patterns CP are disposed and an area on which the sensor patterns PP and the plurality of connection patterns CP are not disposed. Alternatively, the sensing area TA may be defined as an active area that is activated by an electrical signal.

The plurality of sensor patterns PP may include a plurality of first sensor patterns PP1 arranged in the first direction DR1 and a plurality of second sensor patterns PP2 arranged in the second direction DR2. Each of the plurality of first sensor patterns PP1 and the plurality of second sensor patterns PP2 may be disposed on all the first and second areas AR1 and AR2. The plurality of connection patterns CP may connect the adjacent first sensor patterns of the plurality of first sensor patterns PP1 and the adjacent second sensor patterns of the plurality of second sensor patterns PP2. For example, the first sensor patterns adjacent to each other may be the first sensor patterns spaced apart from each other in the first direction DR1, and the second sensor patterns adjacent to each other may be the second sensor patterns spaced apart from each other in the second direction DR2.

The plurality of connection patterns CP may include first connection patterns CP1 and a second connection pattern CPS3. The first connection patterns CP1 may be regularly arranged to be spaced a predetermined distance from each other in the first and second directions DR1 and DR2.

The first connection patterns CP1 may include a central connection pattern CPC, a first outer connection pattern CPS1, and a second outer connection pattern CPS2. Hereinafter, the second connection pattern CPS3 may be called a third outer connection pattern CPS3.

The central connection pattern CPC may be disposed on the first area AR1, and the first to third outer connection patterns CPS1, CPS2, and CPS3 may be disposed on the second area AR2. The first outer connection pattern CPS1 may be disposed to be spaced apart from the central connection pattern CPC in the first direction, and the second outer connection pattern CPS2 may be disposed to be spaced apart from the central connection pattern CPC in the second direction. The third outer connection pattern CPS3 may be disposed to be spaced apart from the central connection pattern CPC in a fourth direction DR4 crossing each of the first and second directions DR1 and DR2.

The boundary BL between the second and third areas AR2 and SA, i.e., the boundary BL between the sensing area TA and the surrounding area SA may include rounded curved boundaries C_BL1 and C_BL2. The third outer connection pattern CPS3 may be surrounded by one of the rounded curved boundaries C_BL1 and C_BL2, the first outer connection pattern CPS1, the second outer connection pattern CPS2, and the central connection pattern CPC.

In the current exemplary embodiment of the inventive concept, the third outer connection pattern CPS3 may be adjusted in position to prevent the third outer connection pattern CPS3 from being damaged by static electricity. For example, the third outer connection pattern CPS3 may be disposed to be spaced in a direction that is away from the rounded curved boundaries C_BL1 and C_BL2. Specific descriptions with respect to this structure will be described below with reference to FIGS. 6A to 6C.

The plurality of driving lines SL may include first driving lines SL1 connected to the plurality of first sensor patterns PP1 and second driving lines SL2 connected to the plurality of second sensor patterns PP2. The plurality of driving lines SL may be disposed on the third area SA.

Each of the plurality of sensor patterns PP, the plurality of connection patterns CP, and the plurality of driving lines SL may include a conductive material. Each of the plurality of sensor patterns PP, the plurality of connection patterns CP, and the plurality of driving lines SL may have a single layer structure or a multi-layer structure.

Each of the plurality of sensor patterns PP, the plurality of connection patterns CP, and the plurality of driving lines SL may include transparent conductive oxide. For example, each of the plurality of sensor patterns PP, the plurality of connection patterns CP, and the plurality of driving lines SL may include at least one of indium-zinc-oxide (IZO), indium-tin oxide (ITO), indium-gallium oxide (IGO), indium-zinc-gallium oxide (IGZO), or a mixture/compound thereof.

Each of the plurality of sensor patterns PP, the plurality of connection patterns CP, and the plurality of driving lines SL may include a metal layer, e.g., molybdenum, silver, titanium, copper, aluminum, or an alloy thereof. The plurality of sensor patterns PP and the plurality of driving lines SL may have the same layer structure or may have layer structures different from each other.

When the plurality of sensor patterns PP include the metal layer, the plurality of sensor patterns PP may include a metal mesh structure. Thus, although the plurality of sensor patterns PP include an opaque material, the possibility of seeing of the plurality of sensor patterns PP from the outside may be reduced.

The pad part PD may be electrically connected to the plurality of driving lines SL. The pad part PD may be disposed on the third area SA. The pad part PD may receive an electrical signal from an external driving circuit (not shown) to transmit the electrical signal to the plurality of driving lines SL and transmit an external touch sensing signal generated on the sensing area TA to the driving circuit. However, the exemplary embodiment of the inventive concept is not limited thereto. For example, the external driving circuit (not shown) may be mounted on the base layer BS.

Figure 4A:
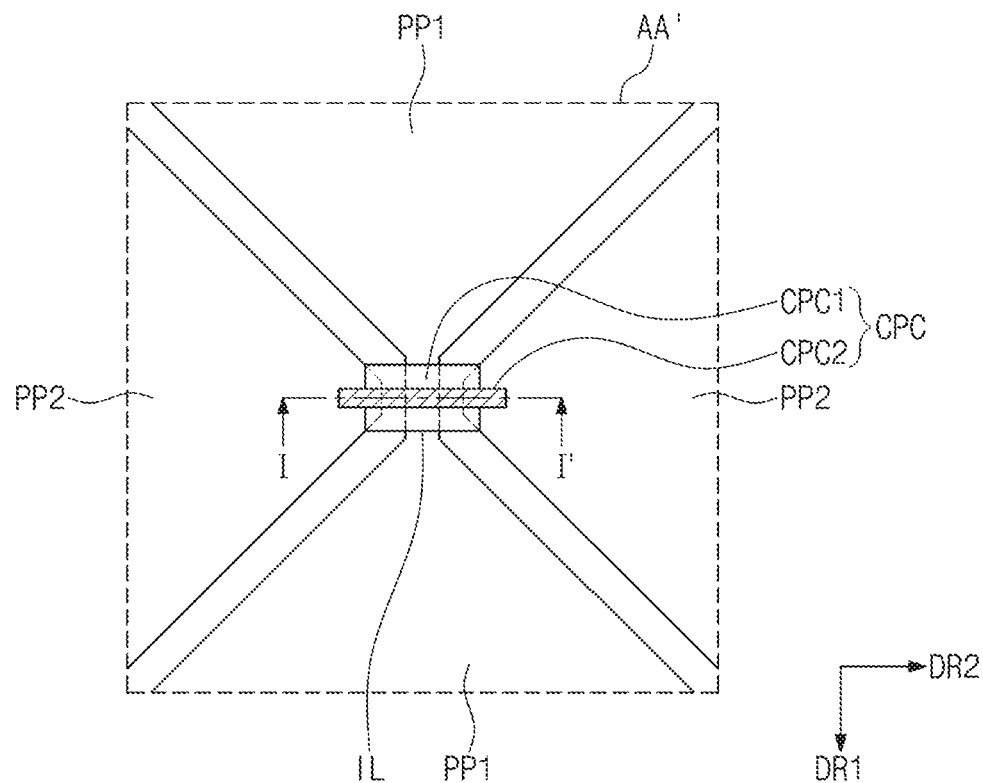
FIG. 4A is an enlarged plan view of an area AA' of FIG. 3.
Figure 4B:
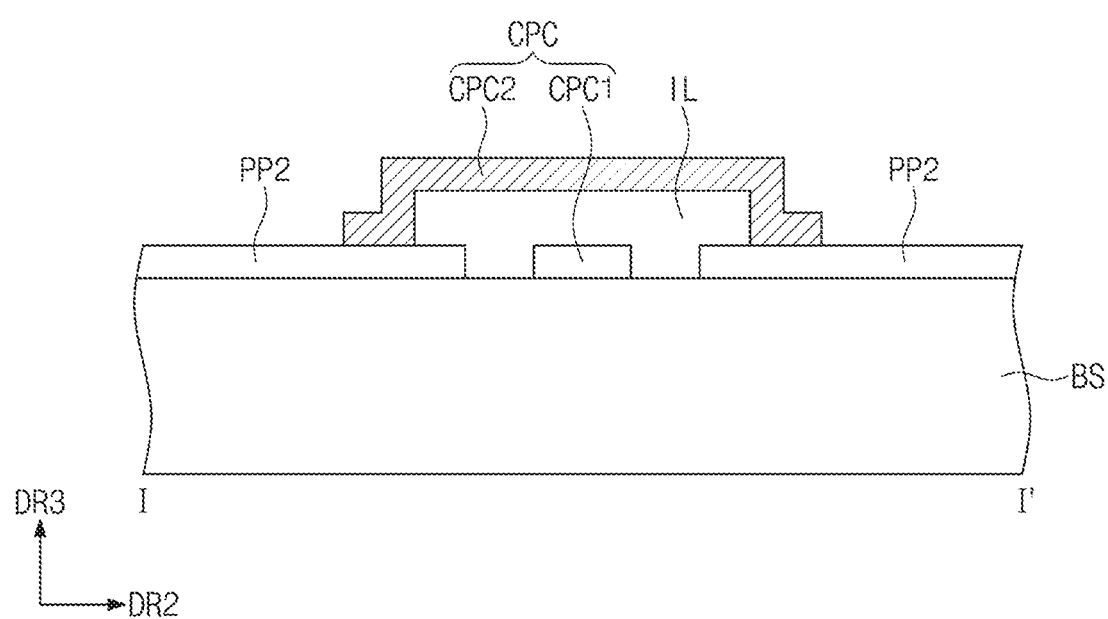
FIG. 4B is a cross-sectional view taken along line I-I' of FIG. 4A.

FIG. 4A is an enlarged plan view of an area AA' of FIG. 3, and FIG. 4B is a cross-sectional view taken along line I-I' of FIG. 4A. FIG. 4A is an enlarged view of an area on which the central connection pattern CPC is disposed on the first area (see reference symbol AR1 of FIG. 3). Each of the first outer connection pattern (see reference symbol CPS1 of FIG. 3), the second outer connection pattern (see reference symbol CPS2 of FIG. 3), and the third outer connection pattern (see reference symbol CPS3 of FIG. 3) may have substantially the same structure. Thus, only the central connection pattern CPC will be described below, and descriptions of the first outer connection pattern (see reference symbol CPS1 of FIG. 3), the second outer connection pattern (see reference symbol CPS2 of FIG. 3), and the third outer connection pattern (see reference symbol CPS3 of FIG. 3) will be omitted.

Referring to FIGS. 4A and 4B, the central connection pattern CPC may include a first central connection part CPC1 and a second central connection part CPC2.

The first central connection part CPC1 may extend in the first direction DR1. The first central connection part CPC1 may be disposed between the first sensor patterns PP1 adjacent to the each other in the first direction DR1 to electrically connect the first sensor patterns PP1 to each other. The first central connection part CPC1 may be formed at the same time together with the first sensor patterns PP1. In this case, the first central connection part CPC1 and the first sensor patterns PP1 may be integrated with each other and include the same material. However, the first central connection part CPC1 and the first sensor patterns PP1 may also be formed through separate processes and include materials different from each other.

The second central connection part CPC2 may extend in the second direction DR2. The second central connection part CPC2 may be insulated from and crosses the first central connection part CPC1. The second central connection part CPC2 may be disposed between the second sensor patterns PP2 adjacent to the each other in the second direction DR2 to electrically connect the second sensor patterns PP2 to each other.

Each of the plurality of first sensor patterns PP1, the plurality of second sensor patterns PP2, and the first central connection part CPC1 may be disposed on the same layer. The second central connection part CPC2 may be disposed to be spaced apart from the first central connection part CPC1 with an insulation pattern IL therebetween in the third direction DR3. The insulation pattern IL may have an island shape and be disposed on each of areas at which the first central connection part CPC1 and the second central connection part CPC2 cross each other.

Although the second central connection part CPC2 extends in the second direction DR2 in FIG. 4A, the exemplary embodiment of the inventive concept is not limited thereto. For example, the second central connection part CPC2 may extend in a direction that is inclined with respect to the second direction DR2 to electrically connect the adjacent second sensor patterns PP2 in the second direction DR2.

Figure 5A:
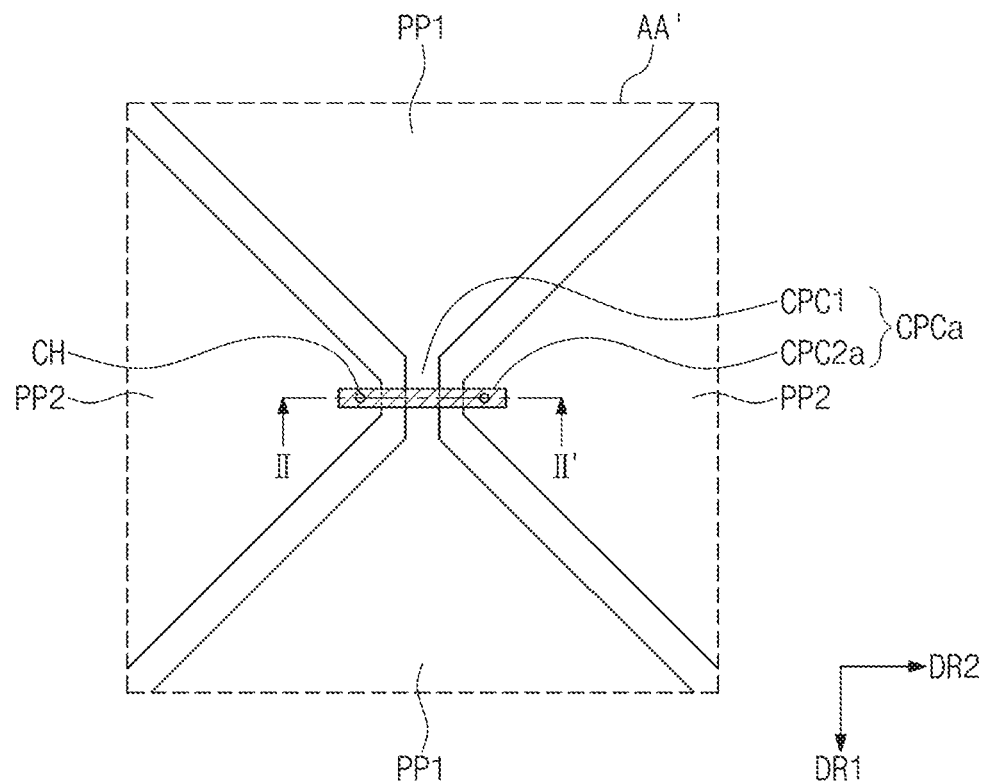
FIG. 5A is an enlarged plan view of an area corresponding to the area AA' of FIG. 3 according to another exemplary embodiment of the inventive concept.
Figure 5B:
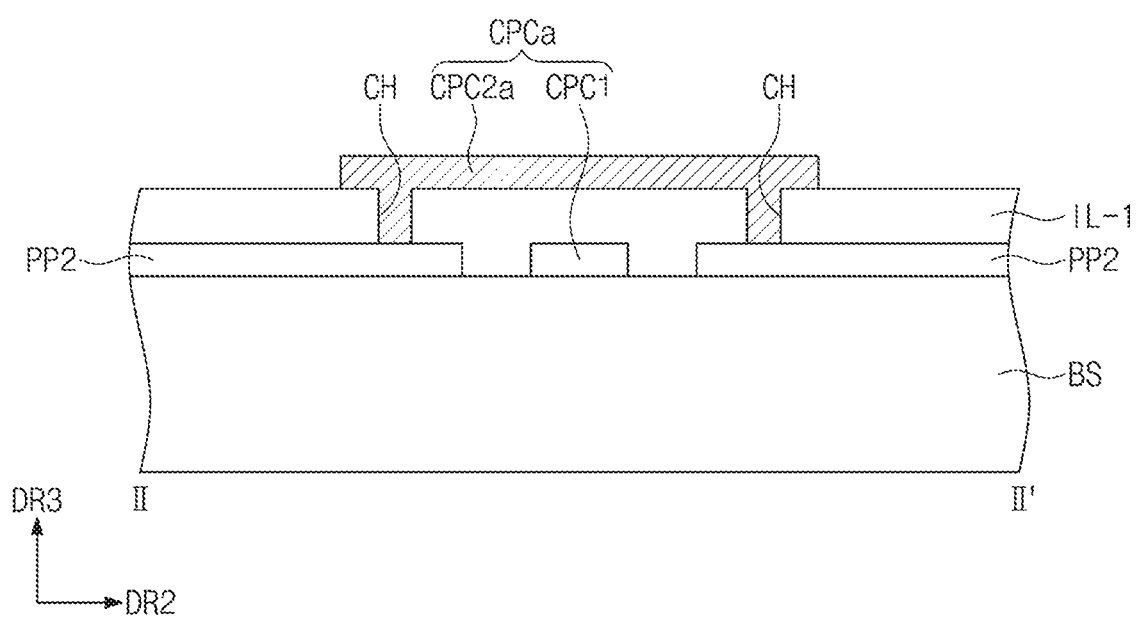
FIG. 5B is a cross-sectional view taken along line II-IF of FIG. 5A.

FIG. 5A is an enlarged plan view of an area corresponding to the area AA' of FIG. 3 according to another exemplary embodiment of the inventive concept, and FIG. 5B is a cross-sectional view taken along line II-IF of FIG. 5A. In description of FIGS. 5A and 5B, the same reference numeral may be given to components that are the same as those of FIG. 2A, and their detailed descriptions will be omitted.

Referring to FIGS. 5A and 5B, a central connection pattern CPCa may include a first central connection part CPC1 and a second central connection part CPC2a.

Each of the plurality of first sensor patterns PP1, the plurality of second sensor patterns PP2, and the first central connection part CPC1 may be disposed on the same layer. The second central connection part CPC2a may be disposed to be spaced apart from the first central connection part CPC1 with an insulation layer IL-1 therebetween in the third direction DR3.

The insulation layer IL-1 may be provided as a layer that covers the plurality of first sensor patterns PP1, the plurality of second sensor patterns PP2, and the first central connection part CPC1. Thus, the plurality of first sensor patterns PP1, the plurality of second sensor patterns PP2, and the first central connection part CPC1 may be disposed between the insulation layer IL-1 and the base layer BS. The second central connection part CPC2a may pass the insulation layer IL-1 through a through-hole CH defined in the insulation layer IL-1 and be connected to each of the second sensor patterns PP2 adjacent thereto.

Figure 5C:
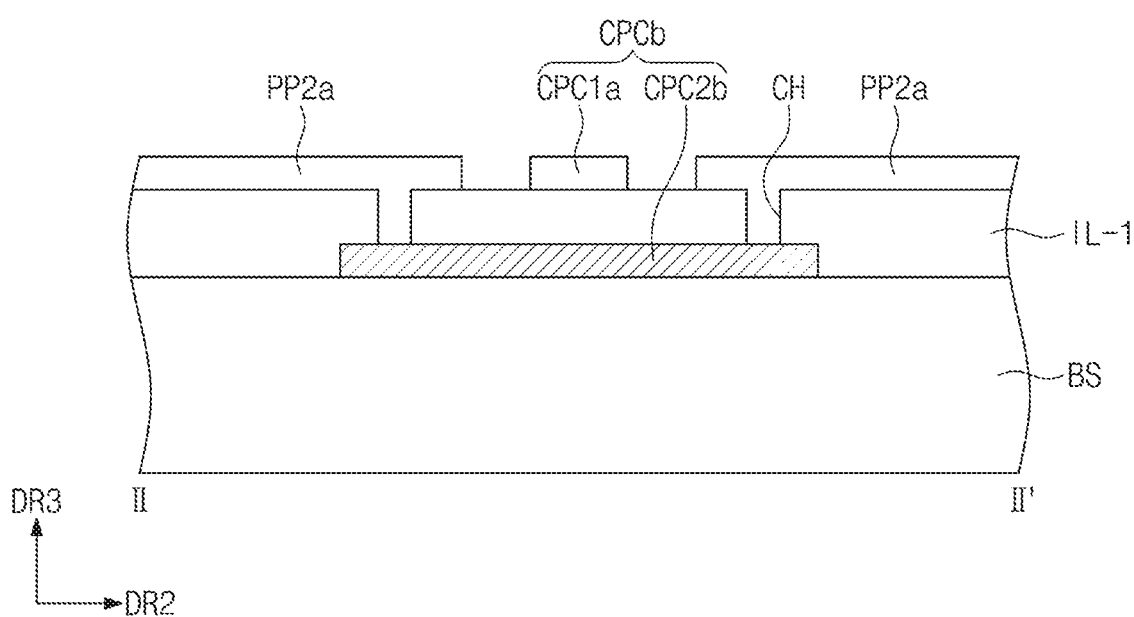
FIG. 5C is a cross-sectional view illustrating a portion of the electronic device according to an exemplary embodiment of the inventive concept.

FIG. 5C is a cross-sectional view illustrating a portion of the electronic device according to an exemplary embodiment of the inventive concept. For convenience of description, FIG. 5C illustrates an area corresponding to that of FIG. 5B.

Referring to FIG. 5C, a central connection pattern CPCb may include a first central connection part CPC1a and a second central connection part CPC2b. Referring to FIG. 5C, the position of the second central connection part CPC2b may be different when compared to FIG. 5B. The second central connection part CPC2b may be disposed under the insulation layer IL-1 A plurality of first sensor patterns (not shown), a plurality of second sensor patterns PP2a, and a first central connection part CPC1a may be disposed on the insulation layer IL-1. Each of two second sensor patterns PP2a, which are adjacent to each other in the second direction DR2, of the plurality of second sensor patterns PP2a may be connected to the second central connection part CPC2b disposed thereunder through the through-holes CH.

Figure 6A:
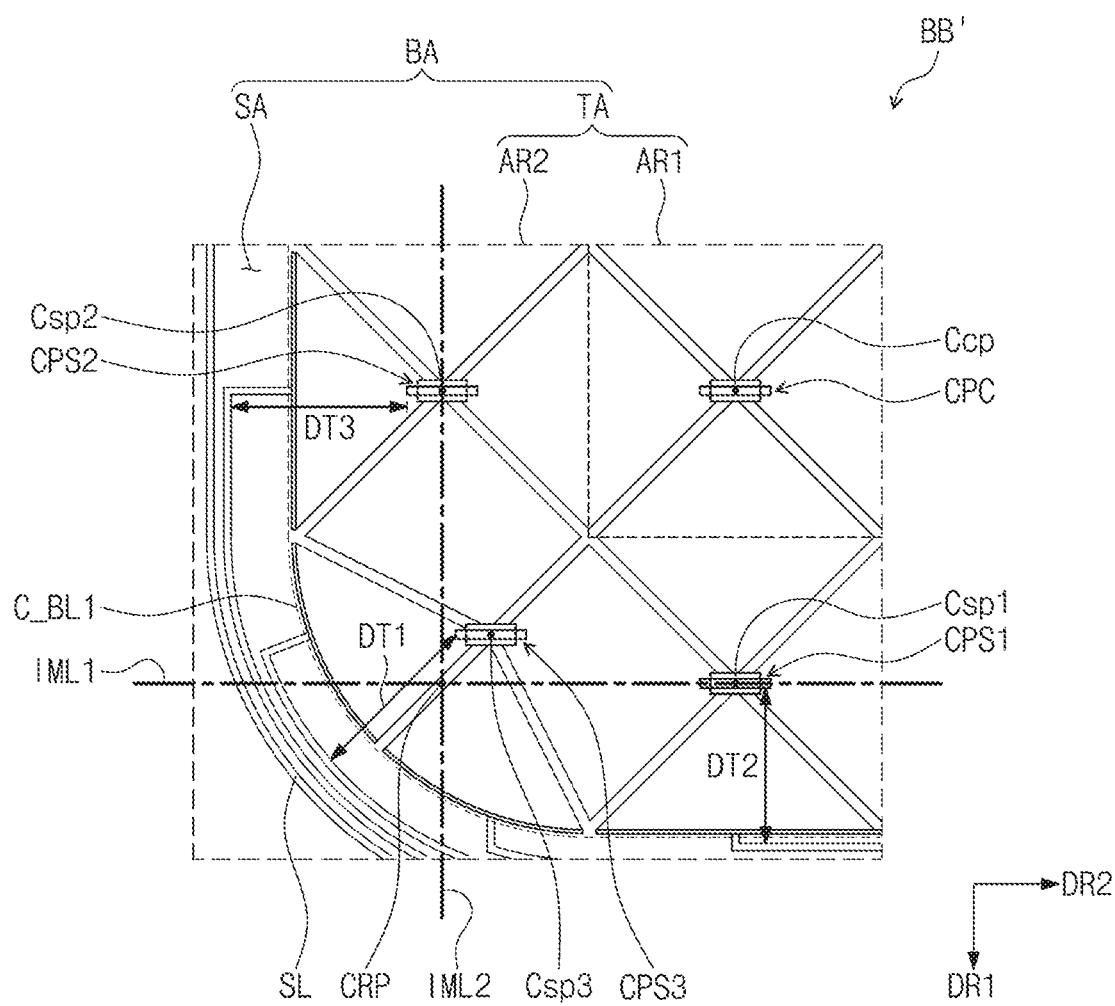
FIG. 6A is an enlarged plan view of an area BB' of FIG. 3.

FIG. 6A is an enlarged plan view of an area BB' of FIG. 3. The area BB' may be illustrated by enlarging a portion on which the first curved boundary C_BL1 is disposed. In description of FIG. 6A, the same reference numeral may be given to components that are the same as the above-described components, and their detailed descriptions will be omitted.

Referring to FIG. 6A, a center Csp1 of the first outer connection pattern CPS1 may be disposed to be spaced apart from a center Ccp of the central connection pattern CPC in the first direction, and a center of Csp2 of the second outer connection pattern CPS2 may be disposed to be spaced apart from a center Ccp of the central connection pattern CPC in the second direction. The center may mean a center of the connection pattern in a length and width direction thereof on a plane.

In FIG. 6A, a first virtual line IML1 extending from the center Csp1 of the first outer connection pattern CPS1 in the second direction DR2, a second virtual line IML2 extending from the center Csp2 of the second outer connection pattern CPS2 in the first direction DR1, and a cross point CRP at which the first virtual line IML1 and the second virtual line IML2 cross each other are illustrated.

A center Csp3 of the third outer connection pattern CPS3 may not overlap the cross point CRP. For example, the third outer connection pattern CPS3 may be disposed to be spaced apart from the cross point CRP in a direction of the first area AR1. The third outer connection pattern CPS3 may be disposed to be spaced apart from the cross point CRP in a predetermined direction between the first and second directions DR1 and DR2, which cross the first and second directions DR1 and DR2. Thus, the center Csp3 of the third outer connection pattern CPS3 may not overlap the first and second virtual lines IML1 and IML2. For example, the center Csp3 of the third outer connection pattern CPS3 may be disposed within an area surrounded by straight lines successively connecting the cross point CRP, the center Csp1 of the first outer connection pattern CPS1, the center Ccp of the central connection pattern CPC, the center Csp2 of the second outer connection pattern CPS2, and the cross point CRP to each other.

The boundary BL (see FIG. 3) between the sensing area TA and the surrounding area SA may include four straight boundaries and four curved boundaries that are rounded to connect the straight boundaries to each other. Particularly, the boundary BL (see FIG. 3) may include a first curved boundary C_BL1 disposed adjacent to the plurality of driving lines SL. The plurality of driving lines SL may be disposed adjacent to the first curved boundary C_BL1 to extend along the first curved boundary C_BL1. The third outer connection pattern CPS3 may face the driving lines SL with the first curved boundary C_BL1 therebetween.

The shortest distance between the third outer connection pattern CPS3 and the driving line, which is closest to the third outer connection pattern CPS3, of the plurality of driving lines SL may be defined as a first distance DT1. The shortest distance between the first outer connection pattern CPS1 and the driving line, which is closest to the first outer connection pattern CPS1, of the plurality of driving lines SL may be defined as a second distance DT2. The shortest distance between the second outer connection pattern CPS2 and the driving line, which is closest to the second outer connection pattern CPS2, of the plurality of driving lines SL may be defined as a third distance DT3. Each of the first to third distances DT1, DT2, and DT3 may have a value ranging from about 1 mm to about 10 mm.

Table 1 below may be a table showing results according to an electrostatic discharge (ESD) test. The ESD test may be performed by applying a voltage to a predetermined point of the electronic device (see reference symbol EA of FIG. 1) so as to determine whether the connection pattern is damaged. For help understanding the description, ten predetermined points (see reference symbol TP of FIG. 1) are illustrated by dot lines. Table 1 shows results obtained through testing while changing polarity of the voltage applied to the ten points (see reference symbol TP of FIG. 1). For example, a voltage of about 15 kV may be applied to each of the ten points (reference symbol TP of FIG. 1), and a voltage of about −15 kV may be applied to each of the ten points (reference symbol TP of FIG. 1) to perform the test. When the connection pattern is damaged by static electricity, this state is expressed by "F." On the other hand, when the connection pattern is not damaged, this state is expressed by "0."

TABLE 1

| Applied Voltage [kV] | Spaced distance between driving line and connection pattern | |
|---|---|---|
| | less than 1 mm | 1 mm or more |
| 13 | O | O |
| 15 | F | O |
| 17 | F | 0 |

Referring to Table 1 above, when a spaced distance between the driving line and the connection pattern is greater than about 1 mm, it is confirmed voltages of 13 kV, 15 kV, and 17 kV are acceptable. Thus, in order to prevent the connection pattern from being damaged by the static electricity, all the first to third distances DT1, DT2, and DT3 may be greater than about 1 mm.

In an exemplary embodiment of the inventive concept, the first distance DT1 may be greater than or equal to the smaller value of the second and third distances DT2 and DT3. Thus, a phenomenon in which charges are concentrated into the third outer connection pattern CPS3 may be prevented. As a result, the possibility of damage of the third outer connection pattern CPS3 by the static electricity may be reduced.

Unlike an exemplary embodiment of the inventive concept, when the third outer connection pattern and the first connection patterns CP1 are regularly arranged at the same pitch, the third outer connection pattern may be disposed at the cross point CRP. The shortest distance between the cross point CRP and the first curved boundary C_BL1 may be less than that between the connection pattern disposed on an area except for the cross point CRP and the boundary (see reference symbol BL of FIG. 3). Thus, the charges accumulated in a predetermined region may move along the driving lines SL and then be concentrated into the connection pattern disposed at the cross point CRP. In this case, the connection pattern disposed at the cross point CRP may be damaged. In an exemplary embodiment of the inventive concept, the third outer connection pattern CPS3 may be adjusted in position to prevent one connection pattern from being damaged due to the concentration of the charges into the one connection pattern.

Since the third outer connection pattern CPS3 is disposed to be spaced apart from the cross point CRP in a direction that is away from the first curved boundary C_BL1, the concentration of the charges into the third outer connection pattern CPS3 may be prevented to improve product reliability.

As the third outer connection pattern CPS3 is adjusted in position, each of the first and second sensor patterns, which are connected to each other by the third outer connection pattern CPS3, of the plurality of first and second sensor patterns PP1 and PP2 may have a shape different from that of each of the first and second sensor patterns as illustrated in FIG. 6A.

Figure 6B:
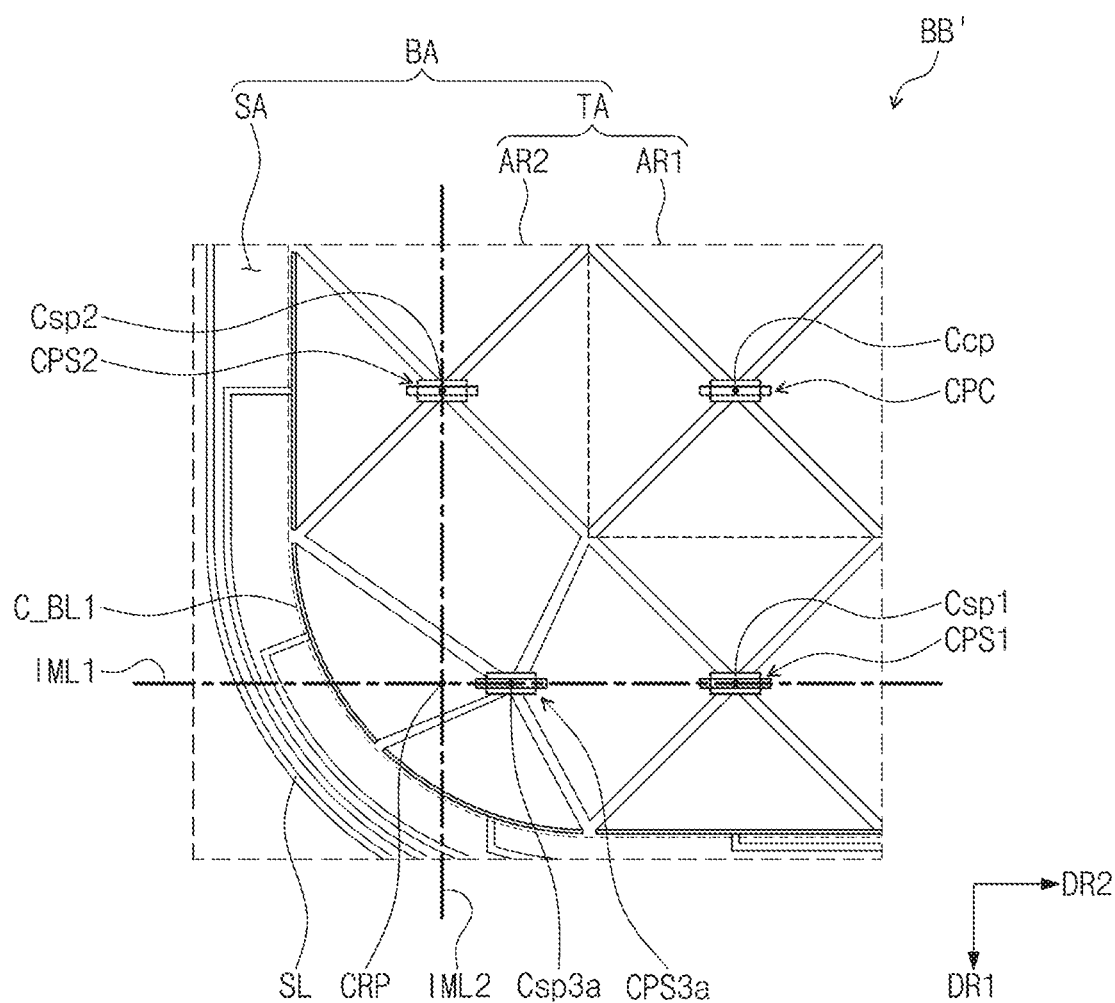
FIG. 6B is an enlarged plan view of an area corresponding to the area BB' of FIG. 3 according to another exemplary embodiment of the inventive concept.
Figure 6C:
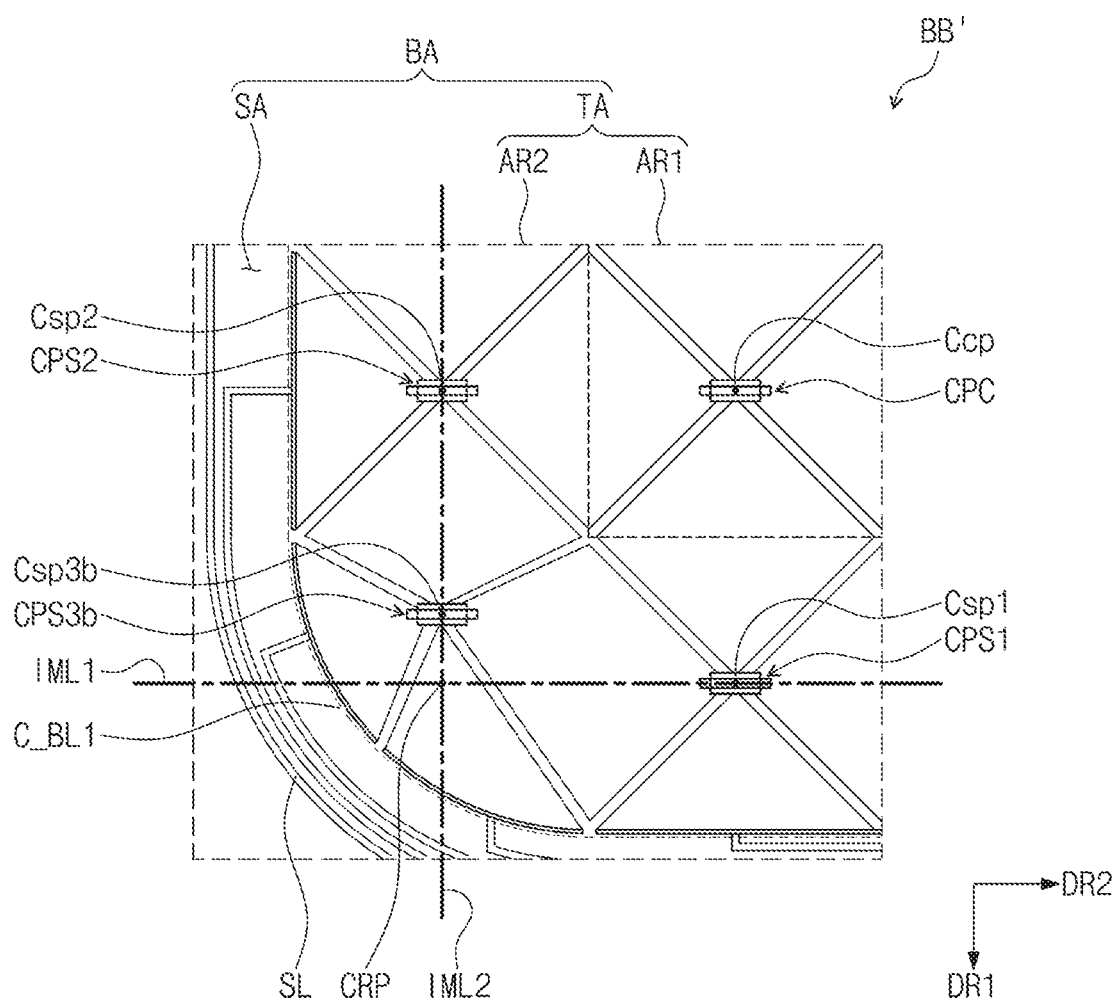
FIG. 6C is an enlarged plan view of an area corresponding to the area BB' of FIG. 3 according to another exemplary embodiment of the inventive concept.

FIG. 6B is an enlarged plan view of an area corresponding to the area BB' of FIG. 3 according to another exemplary embodiment of the inventive concept, and FIG. 6C is an enlarged plan view of an area corresponding to the area BB' of FIG. 3 according to another exemplary embodiment of the inventive concept.

Referring to FIG. 6B, a center Csp3a of a third outer connection pattern CPS3a may not overlap the cross point CRP. The third outer connection pattern CPS3a may be disposed to be spaced from the cross point CRP in the second direction DR2. Particularly, the center Csp3a of the third outer connection pattern CPS3a may be disposed on the first virtual line IML1 between the cross point CRP and the first outer connection pattern CPS1.

Referring to FIG. 6C, a center Csp3b of a third outer connection pattern CPS3b may not overlap the cross point CRP. The third outer connection pattern CPS3b may be disposed to be spaced from the cross point CRP in the first direction DR1. Particularly, the center Csp3b of the third outer connection pattern CPS3b may be disposed on the first virtual line IML1 between the cross point CRP and the second outer connection pattern CPS2.

Referring to FIGS. 6B and 6C, each of the third outer connection patterns CPS3a and CPS3b may be disposed to be spaced apart from the cross point CRP in the direction that is away from the first curved boundary C_BL1. Thus, charges introduced from the outside may be concentrated into the third outer connection patterns CPS3a and CPS3b to reduce possibility of damage of the third outer connection patterns CPS3a and CPS3b.

Figure 7A:
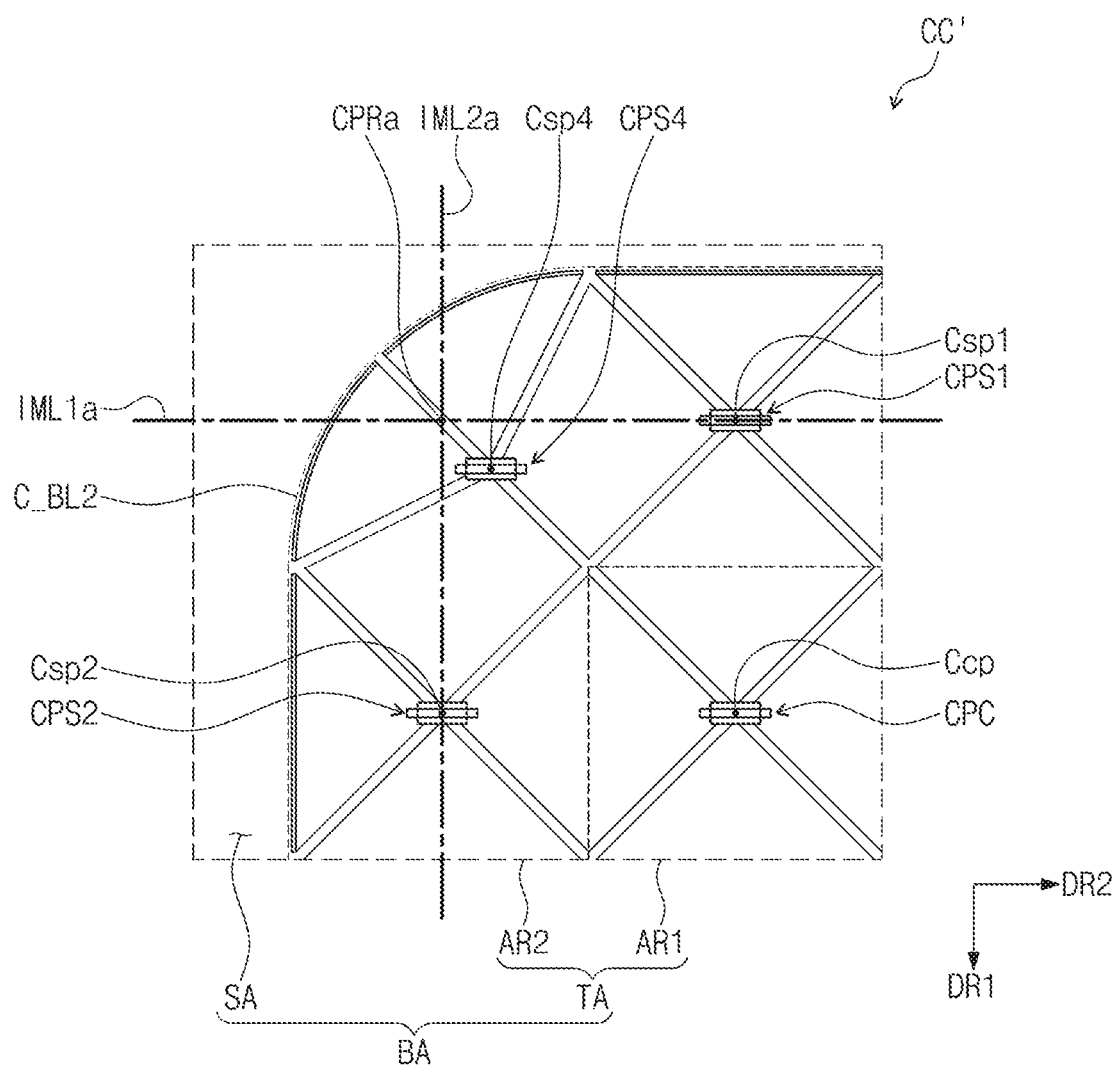
FIG. 7A is an enlarged plan view of an area CC' of FIG. 3.

FIG. 7A is an enlarged plan view of an area CC' of FIG. 3. The area CC' may be illustrated by enlarging a portion on which the second curved boundary C_BL2 is disposed. In description of FIG. 7A, the same reference numeral may be given to components that are the same as the above-described components, and their detailed descriptions will be omitted.

Referring to FIG. 7A, the central connection pattern CPC, the first outer connection pattern CPS1, the second outer connection pattern CPS2, and a fourth outer connection pattern CPS4 are illustrated. The fourth outer connection pattern CPS4 may be disposed between the second curved boundary C_BL2 and the central connection pattern CPC. The plurality of driving lines (see reference symbol SL of FIG. 3) may not be adjacent to the second curved boundary C_BL2.

In FIG. 7A, a first virtual line IML1a extending from the center Csp1 of the first outer connection pattern CPS1 in the second direction DR2, a second virtual line IML2a extending from the center Csp2 of the second outer connection pattern CPS2 in the first direction DR1, and a cross point CPRa at which the first virtual line IML1a and the second virtual line IML2a cross each other are illustrated.

A center Csp4 of the fourth outer connection pattern CPS4 may not overlap the cross point CPRa. For example, the fourth outer connection pattern CPS4 may be disposed to be spaced apart from the cross point CPRa in a direction of the first area AR1.

The fourth outer connection pattern CPS4 may be disposed to be spaced in a predetermined direction between the first and second directions DR1 and DR2, which cross the first and second directions DR1 and DR2. However, the exemplary embodiment of the inventive concept is not limited thereto. Similar to the descriptions of FIGS. 6B and 6C, the center Csp4 of the fourth outer connection pattern CPS4 may be disposed on the first virtual line IML1a between the cross point CPRa and the first outer connection pattern CPS1 or disposed on the virtual line IML2a between the cross point CPRa and the second outer connection pattern CPS2.

That is, the connection patterns (see reference symbol CP of FIG. 3) and the sensor patterns (see reference symbol PP of FIG. 3) which are disposed on the sensing area TA may have shapes that are symmetrical to each of a reference line (see reference symbol SD1 of FIG. 3) passing through a center TA_c of the sensing area TA extending in the first direction DR1 and a reference line (see reference symbol SD2 of FIG. 3) passing through a center TA_c of the sensing area TA.

Figure 7B:
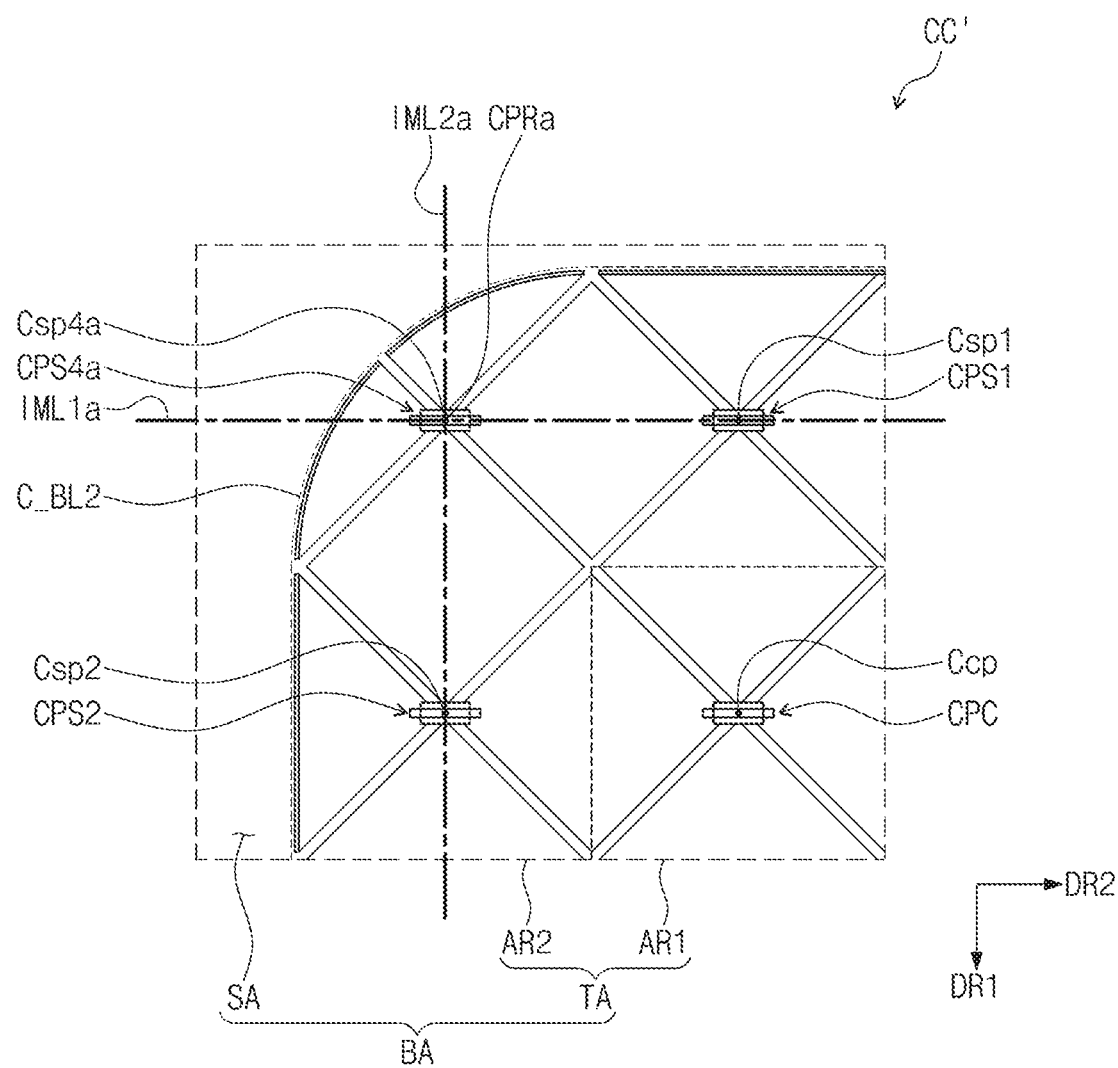
FIG. 7B is an enlarged plan view of an area corresponding to the area CC' of FIG. 3 according to another exemplary embodiment of the inventive concept.

FIG. 7B is an enlarged plan view of an area corresponding to the area CC' of FIG. 3 according to another exemplary embodiment of the inventive concept. In description of FIG. 7B, the same reference numeral may be given to components that are the same as the above-described components, and their detailed descriptions will be omitted.

Referring to FIG. 7B, the central connection pattern CPC, the first outer connection pattern CPS1, the second outer connection pattern CPS2, and a fourth outer connection pattern CPS4a are illustrated. The fourth outer connection pattern CPS4a may be disposed between the second curved boundary C_BL2 and the central connection pattern CPC. A center Csp4a of the third outer connection pattern CPS4a may overlap the cross point CPRa.

The charges accumulated in the plurality of driving lines (see reference symbol SL) may move to the connection pattern in a moment, and thus, the connection pattern may be degraded and damaged by the concentration of the charges. However, the plurality of driving lines (see reference symbol SL of FIG. 3) may not be adjacent to the second curved boundary C_BL2. Thus, according to an exemplary embodiment of the inventive concept, the outer connection pattern facing the plurality of driving lines (see reference symbol SL of FIG. 2) with the curved boundary therebetween, for example, the third outer connection pattern (see reference symbol CPS3 of FIG. 3) may be adjusted in only one position, and the outer connection pattern, which does not face the plurality of driving lines (see reference symbol SL of FIG. 2) with the curved boundary therebetween, for example, the fourth outer connection pattern CPS4a, may be regularly arranged with the central connection pattern CPC at the same pitch.

Figure 8:
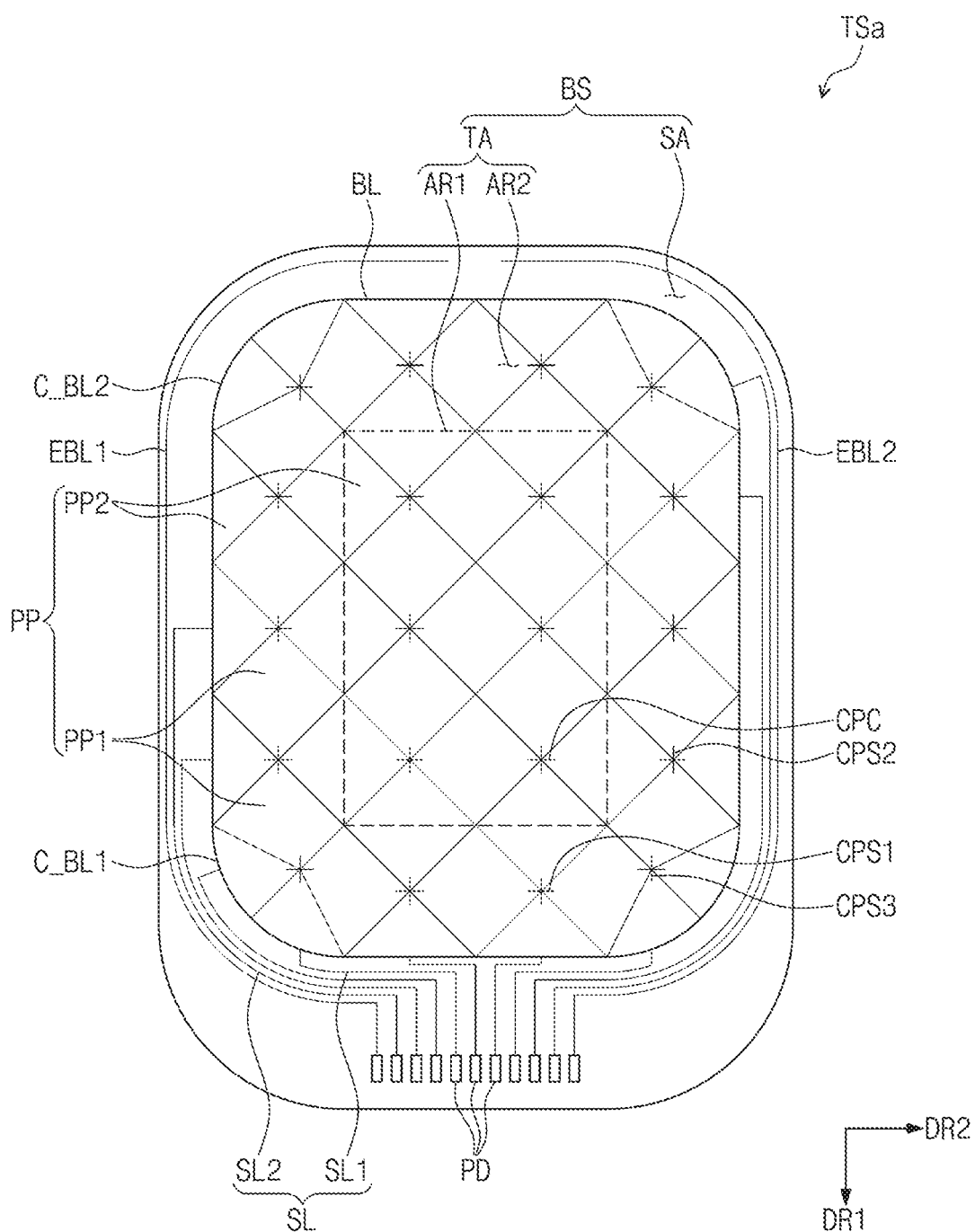
FIG. 8 is a schematic plan view of a sensor according to an exemplary embodiment of the inventive concept.

FIG. 8 is a schematic plan view of a sensor TSs according to an exemplary embodiment of the inventive concept. In description of FIG. 8, the same reference numeral may be given to components that are the same as the above-described components of FIG. 3, and their detailed descriptions will be omitted.

Referring to FIG. 8, the sensor TSa may further include two conductive lines EBL1 and EBL2 disposed on the third area SA. A ground voltage may be applied to each of the conductive lines EBL1 and EBL2 to prevent the sensor TSa from being damaged by static electricity.

The conductive lines EBL1 and EBL2 may be disposed to face each other with the sensing area TA therebetween. Each of the conductive lines EBL1 and EBL2 may receive the ground voltage through a separate pad. However, the exemplary embodiment of the inventive concept is not limited thereto. For example, the conductive lines EBL1 and EBL2 may be integrated with each other.

Figure 9:
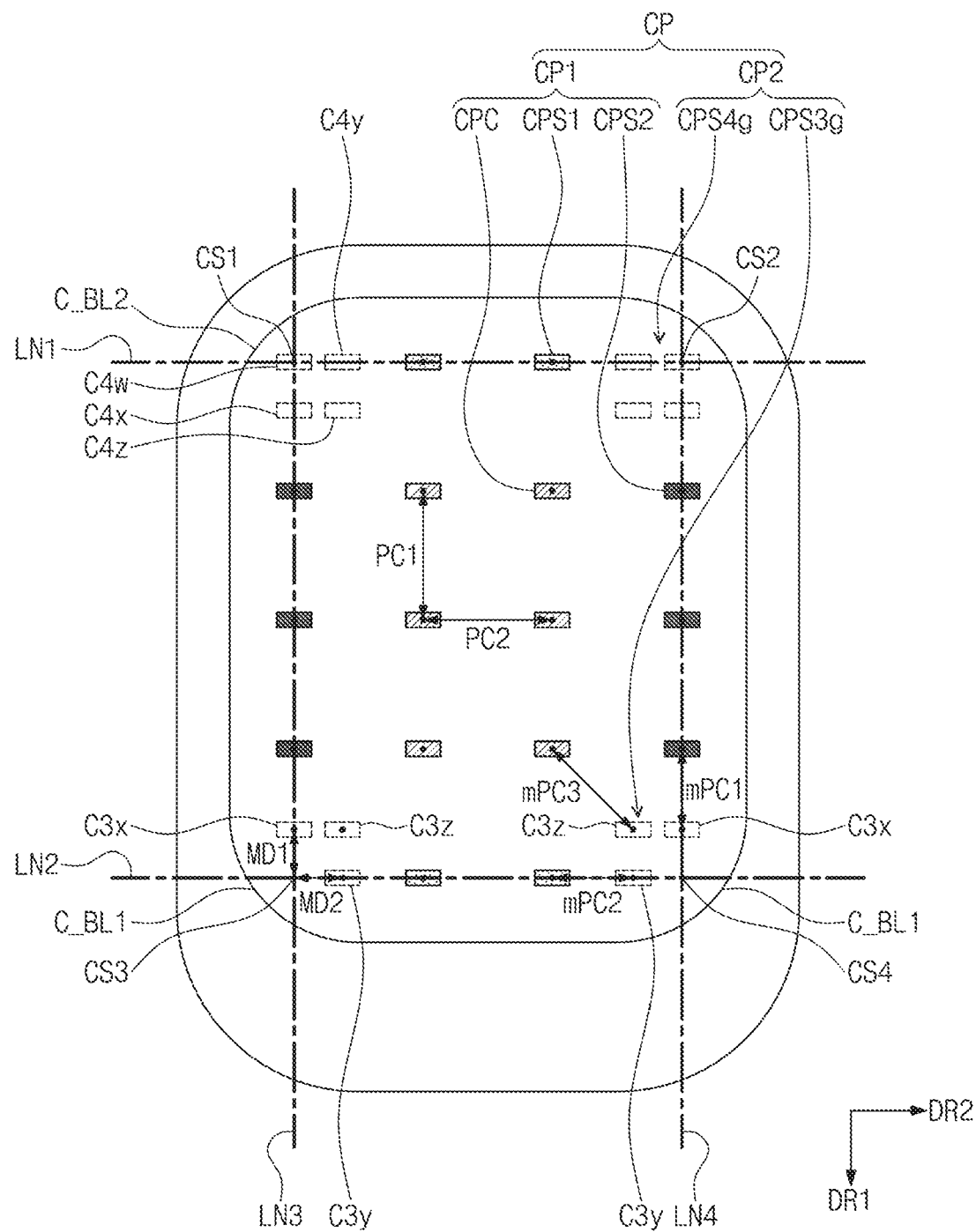
FIG. 9 is a schematic plan view illustrating a portion of constitutions of the sensor according to an exemplary embodiment of the inventive concept.

FIG. 9 is a schematic plan view illustrating a portion of constitutions of the sensor according to an exemplary embodiment of the inventive concept. FIG. 9 schematically illustrates only the base layer BS and the connection pattern CP of FIG. 3. Particularly, a portion of the connection pattern CP is enlarged to improve visibility.

Referring to FIGS. 3 and 9, the plurality of connection patterns CP may be arranged in the form of an M by N matrix (where M and N are integers greater than 1).

Although a 5 by 4 matrix is illustrated as an example in FIG. 9, the exemplary embodiment of the inventive concept is not limited thereto.

A first line LN1 passing through a center of the connection patterns, which are disposed at a first-row second-column to a first-row ((N-1)-th)-column, a second line LN2 passing through a center of the connection patterns, which are disposed at a (M-th)-row second-column to a (M-th)-row ((N-1)-th)-column, a third line LN3 passing through a center of the connection patterns, which are disposed at a second-row first-column to a ((M-1)-th)-row first-column, and a fourth line LN4 passing through a center of the connection patterns, which are disposed at a second-row (N-th)-column to a ((M-1)-th)-row (N-th)-column are illustrated. A point at which the first line LN1 and the third line LN3 cross each other may be defined as a first cross point CS1, a point at which the first line LN1 and the fourth line LN4 cross each other may be defined as a second cross point CS2, a point at which the second line LN2 and the third line LN3 cross each other may be defined as a third cross point CS3, and a point at which the second line LN2 and the fourth line LN4 cross each other may be defined as a fourth cross point CS4.

The connection pattern of a third outer connection pattern group CPS3$g$, which is disposed at a (M-th)-row first-column and a (M-th)-row (N-th)-column and expressed by dotted lines, and the connection pattern of a fourth outer connection pattern group CPS4$g$, which is disposed at a first-row first-column and a first-row (N-th)-column and expressed by dotted lines, may not be disposed at the first, second, third, and fourth cross points CS1, CS2, CS3, and CS4. Particularly, the connection pattern of the third outer connection pattern group CPS3$g$ adjacent to the first curved boundary C_BL1 defined between the driving lines SL and the sensing area TA may not be disposed at the third and fourth cross points CS3 and CS4. However, the connection patterns of the fourth outer connection pattern group CPS4$g$ adjacent to the second curved boundary C_BL2 may be disposed at the first and second cross points CS1 and CS2.

The connection patterns, which are expressed by dotted lines, of the third and fourth outer connection pattern groups CPS3$g$ and CPS4$g$ are illustrated for convenience of description and thus may not be disposed at all the designated points, but be disposed at other points. For example, the connection pattern disposed at the first-row first-column may be disposed at one of the four connection patterns, which are expressed by the dotted lines, of the fourth outer connection pattern group CPS4$g$. Also, the connection pattern disposed at the (M-th)-row first-column may be disposed at one of the three connection patterns, which are expressed by the dotted lines, of the third outer connection pattern group CPS3$g$.

The first outer connection pattern CPS1, the second outer connection pattern CPS2, and the central connection pattern CPC may be disposed to be spaced a distance of the first pitch PC1 from each other in the first direction DR1 and spaced a distance of the second pitch PC2 from each other in the second direction DR2. The first outer connection pattern CPS1, the second outer connection pattern CPS2, and the central connection pattern CPC, which are arranged at a regular distance, may be called first connection patterns CP1.

Referring to FIGS. 8 and 9, the distance of the second pitch PC2 may correspond to a value obtained by dividing the width of the sensing area TA in the second direction DR2 by the number of channels arranged in the second direction DR2. Particularly, the first sensor pattern PP1 arranged in the first direction DR1 may be defined as a first channel. The first channel may be provided in plurality, and the plurality of first channels may be arranged in the second direction DR2. In FIG. 8, four first channels are exemplarily illustrated. That is, the distance of the second pitch PC2 may correspond to a value obtained by dividing the width of the sensing area TA in the second direction DR2 by the number of first sensor patterns PP1 arranged in the second direction DR2.

The distance of the first pitch PC1 may correspond to a value obtained by dividing the width of the sensing area TA in the first direction by the number of channels arranged in the first direction DR1. Particularly, the second sensor pattern PP2 arranged in the second direction DR2 may be defined as a second channel. The second channel may be provided in plurality, and the plurality of second channels may be arranged in the first direction DR1. In FIG. 8, five second channels are exemplarily illustrated. That is, the distance of the first pitch PC1 may correspond to a value obtained by dividing the width of the sensing area TA in the first direction DR1 by the number of second sensor patterns PP2 arranged in the first direction DR1.

The third outer connection pattern C3$x$, C3$y$, or C3$z$ of the third outer connection pattern group CPS3$g$ and the fourth outer connection pattern C4$w$, C4$x$, C4$y$, or C4$z$ of the fourth outer connection pattern group CPS4$g$ may be irregularly arranged, unlike the first connection patterns CP1. Thus, the third outer connection pattern C3$x$, C3$y$, or C3$z$ and the fourth outer connection pattern C4$w$, C4$x$, C4$y$, or C4$z$ may be called second connection patterns CP2.

A first distance MD1 between the third outer connection pattern C3$x$ and the third cross point CS3 may be greater than about $1/10$ of the first pitch PC1. A second distance MD2 between the third outer connection pattern C3$y$ and the third cross point CS3 may be greater than about $2/10$ of the second pitch PC2. The third outer connection pattern C3$z$ may be disposed to be spaced the first distance MD1 from the third cross point CS3 and spaced the second distance MD2 from the third cross point CS3 in the second direction DR2.

A minimum pitch mPC1, mPC2, or mPC3 between the third outer connection pattern C3$x$, C3$y$, or C3$z$ and the first connection pattern CP1 that is closest to the third outer connection pattern C3$x$, C3$y$, or C3$z$ may be different from the first pitch PC1 and the second pitch PC2. For example, the minimum pitch mPC1, mPC2, or mPC3 may be less than the first pitch PC1 and the second pitch PC2.

Figure 10:
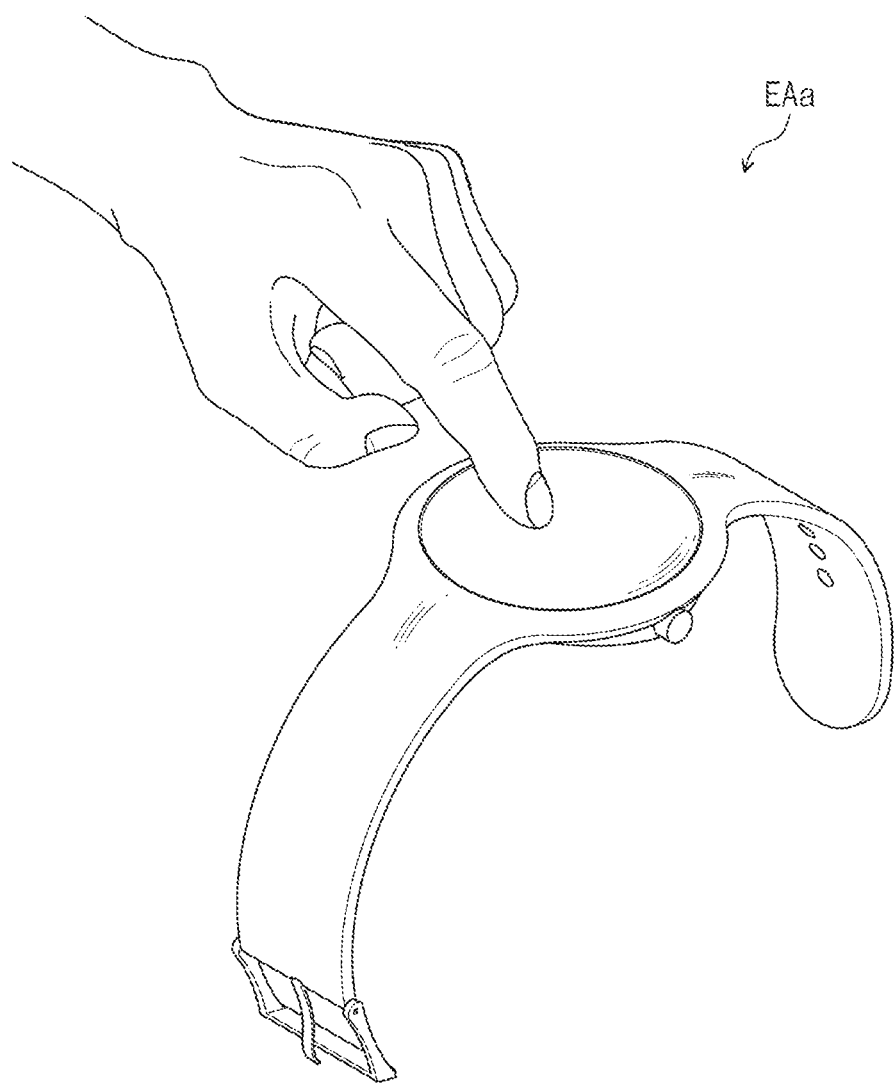
FIG. 10 is a perspective view illustrating a state of use of an electronic device according to an exemplary embodiment of the inventive concept.
Figure 11:
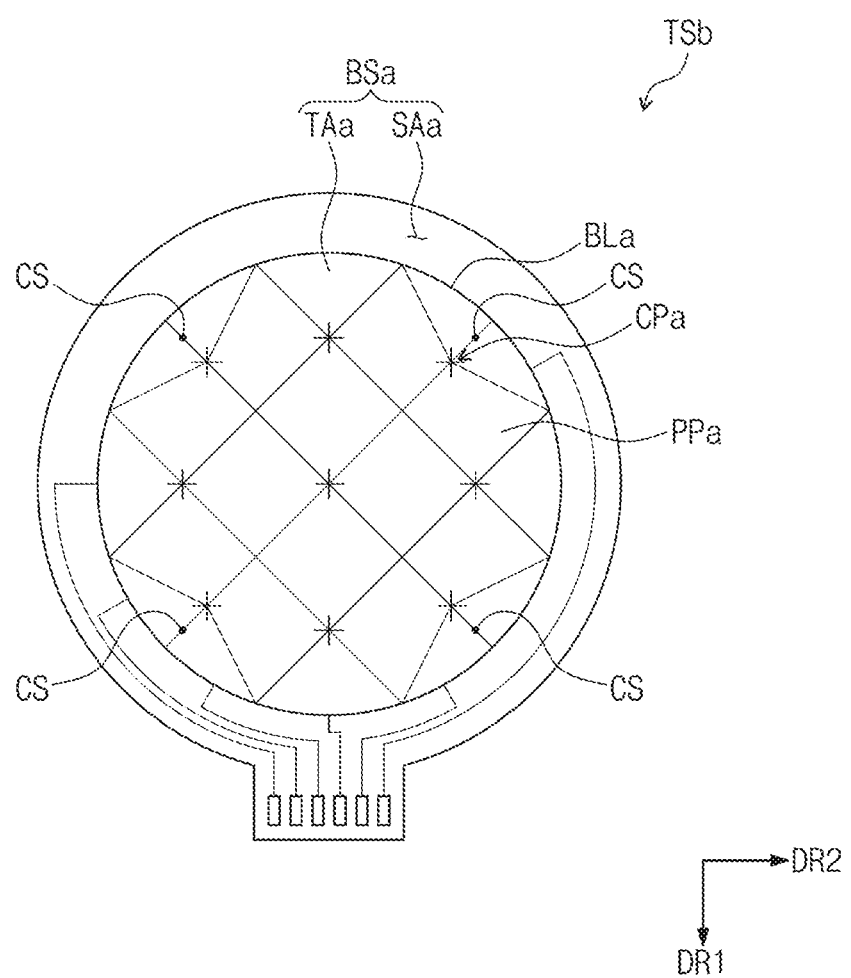
FIG. 11 is a schematic plan view of a sensor according to an exemplary embodiment of the inventive concept.

FIG. 10 is a perspective view illustrating a state of use of an electronic device EAa according to an exemplary embodiment of the inventive concept, and FIG. 11 is a schematic plan view of a sensor TSb according to an exemplary embodiment of the inventive concept.

Referring to FIGS. 10 and 11, a wearable electronic device that may be worn on a wrist is illustrated as an example of the electronic device EAa. The electronic device EAa may have a circular active area.

A base layer BSa may include a sensing area TAa and a surrounding area SAa. The sensing area TAa may have a circular shape. Thus, a boundary BLa between the sensing area TAa and the surrounding area SAa may have a circular shape.

A plurality of sensor patterns PPa sensing touch applied from the outside and connection patterns CPa connecting the sensor patterns, which are adjacent to each other, of the plurality of sensor patterns PPa may be disposed on the sensing area TAa.

The connection patterns CPa may be arranged in the form of an M×N matrix (where M and N are integers greater than 1). Above all, when the connection patterns disposed at a first-row first-column, a first-row (N-th)-column, a (M-th)-row first column, and a (M-th)-row (N-th)-column are irregularly arranged, the connection patterns may be disposed to be spaced apart from the position CS, at which the connection patterns will be disposed, in a direction that is away from the boundary BLa. Thus, charges may be concentrated into a specific connection pattern from the outside to reduce possibility of damage of the specific connection pattern.

According to the exemplary embodiment of the inventive concept, the connection pattern adjacent to the curved boundary may be disposed to be spaced a predetermined distance from the curved boundary. Thus, as the charges are concentrated into the specific connection pattern, the phenomenon in which the connection pattern is degraded and thus damaged may be prevented.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An electronic device comprising:
a base layer comprising a first area, a second area outside of and surrounding the first area, and a third area outside of and surrounding the second area, wherein a boundary between the second area and the third area comprises a curved boundary; and
a sensor comprising a plurality of sensor patterns disposed on the first and second areas and a plurality of connection patterns configured to connect adjacent sensor patterns of the plurality of sensor patterns, each of the plurality of connection patterns comprising a center defined by a crossing point of a first connection part and a second connection part,
wherein the plurality of connection patterns comprise:
a central connection pattern disposed on the first area;
a first outer connection pattern, wherein the center of the first outer connection pattern is disposed to be spaced apart from the center of the central connection pattern in a first direction, and the first outer connection pattern is a connection pattern that is disposed closest to the third area in the first direction among all of the plurality of connection patterns;
a second outer connection pattern, wherein the center of the second outer connection pattern is disposed to be spaced apart from the center of the central connection pattern in a second direction perpendicular to the first direction, and the second outer pattern is a connection pattern that is disposed closest to the third area in the second direction among all of the plurality of connection patterns, and
a third outer connection pattern disposed on the second area, wherein the center of the third outer connection pattern is disposed to be spaced apart from the center of the central connection pattern in a third direction crossing the first and second directions in a plane of the first and second directions, and the third outer connection pattern is a connection pattern that is disposed closest to the third area in the third direction among all of the plurality of connection patterns, and
the center of the third outer connection pattern does not overlap a first cross point at which a first virtual line extending from the center of the first outer connection pattern in the second direction and a second virtual line extending from the center of the second outer connection pattern in the first direction cross each other.

2. The electronic device of claim 1, wherein:
the sensor further comprises a plurality of driving lines disposed on the third area to connect the sensor patterns, which are adjacent to the boundary, of the plurality of sensor patterns to each other, and
the plurality of driving lines are disposed adjacent to the curved boundary to extend in a curved manner along the curved boundary, and the third outer connection pattern faces the plurality of driving lines with the curved boundary therebetween.

3. The electronic device of claim 2, wherein a distance between the third outer connection pattern and a driving line, which is closest to the third outer connection pattern, of the plurality of driving lines is greater than 1 mm.

4. The electronic device of claim 2, wherein a shortest distance between the third outer connection pattern and a driving line, which is closest to the third outer connection pattern, of the plurality of driving lines is a first distance,
a shortest distance between the first outer connection pattern and a driving line, which is closest to the first outer connection pattern, of the plurality of driving lines is a second distance,
a shortest distance between the second outer connection pattern and a driving line, which is closest to the second outer connection pattern, of the plurality of driving lines is a third distance, and
the first distance is greater than or equal to a smaller value of the second distance and the third distance.

5. The electronic device of claim 1, wherein the center of the third outer connection pattern is disposed on the first virtual line between the first cross point and the first outer connection pattern.

6. The electronic device of claim 1, wherein the center of the third outer connection pattern is disposed on the second virtual line between the first cross point and the second outer connection pattern.

7. The electronic device of claim 1, wherein the center of the third outer connection pattern is disposed within an area that is surrounded by lines successively connecting the first cross point, the first outer connection pattern, the central connection pattern, the second outer connection pattern, and the first cross point to each other.

8. The electronic device of claim 1, wherein the central connection pattern is provided in plurality, and the plurality of central connection patterns are disposed to be spaced a first pitch from each other in the first direction and spaced a second pitch from each other in the second direction.

9. The electronic device of claim 8, wherein the center of the third outer connection pattern is spaced a distance of about $1/10$ or more of the first pitch from the first cross point in a direction that is directed to the second outer connection pattern.

10. The electronic device of claim 8, wherein the center of the third outer connection pattern is spaced a distance of about $1/10$ or more of the second pitch from the first cross point in a direction that is directed to the first outer connection pattern.

11. The electronic device of claim 8, wherein the center of the third outer connection pattern is disposed to be spaced a distance of about $1/10$ or more of the first pitch from the first cross point in the first direction and spaced a distance of about $1/10$ or more of the second pitch from the first cross point in the second direction.

12. The electronic device of claim 8, wherein the boundary between the second area and the third area further comprises a first curved boundary, a straight boundary extending from the first curved boundary, and a second curved boundary extending from the straight boundary; and
the plurality of connection patterns further comprise a fourth outer connection pattern disposed between the second curved boundary and the central connection pattern.

13. The electronic device of claim 12, wherein a center of the fourth outer connection pattern overlaps a second cross point at which the first virtual line and the second virtual line cross each other.

14. The electronic device of claim 12, wherein a center of the fourth outer connection pattern does not overlap a second cross point at which the first virtual line and the second virtual line cross each other and is disposed within an area surrounded by successively connecting the second cross point, the first outer connection pattern, the central connection pattern, the second outer connection pattern, and the second cross point to each other.

15. The electronic device of claim 1, wherein the boundary between the second area and third area has a circular or oval shape.

16. The electronic device of claim 1, further comprising a display panel disposed under the base layer to display an image, and
wherein a first edge of a first sensor pattern directly contacted to the first outer connection pattern among the plurality of sensor patterns, a second edge of a second sensor pattern directly contacted to the second outer connection pattern among the plurality of sensor patterns, and a third edge of a third sensor pattern directly contacted to the third outer connection pattern among the plurality of sensor patterns are directly adjacent the boundary.

17. An electronic device, comprising:
a base layer comprising a sensing area and a surrounding area configured to surround the sensing area, wherein a boundary between the sensing area and the surrounding area comprises a curved boundary;
a plurality of sensor patterns comprising discrete shapes disposed on the sensing area and arranged in a first direction and a second direction;
a plurality of driving lines disposed on the surrounding area to connect the sensor patterns, which are adjacent to the boundary, of the plurality of sensor patterns; and
a plurality of connection patterns disposed on the sensing area to connect adjacent sensor patterns of the plurality of sensor patterns, and comprising first connection patterns arranged to be spaced apart by a first pitch in the first direction and a second pitch in the second direction on a plane and a second connection pattern disposed closest to the curved boundary among all of the plurality of connection patterns between the first connection patterns and the curved boundary,
wherein a shortest pitch in a third direction between the second connection pattern and a first connection pattern closest to the second connection pattern among the first connection patterns is less than each of the first and second pitches,
wherein the first pitch is a pitch between the first connection patterns which are closest to each other in the first direction, and the second pitch is a pitch between the first connection patterns which are closest to each other in the second direction, and
wherein the third direction is parallel to the first direction or the second direction.

18. The electronic device of claim 17, wherein each of the curved boundary and the second connection pattern is provided in plurality,
the boundary further comprises straight boundaries configured to connect the plurality of curved boundaries to each other, and
each of the plurality of second connection patterns is disposed between each of the curved boundaries and each of the first connection patterns.

19. An electronic device comprising:
a base layer comprising a sensing area and a surrounding area configured to surround the sensing area;
a plurality of sensor patterns disposed on the sensing area; and
a plurality of connection patterns disposed on the sensing area to connect adjacent sensor patterns of the plurality of sensor patterns and arranged in a form of a M by N matrix of rows and columns, respectively,
wherein M and N are integers greater than 3,
a first straight line is defined as a line extending across the sensing area and passing through a center of a first connection pattern among the plurality of connection patterns disposed at a first-row and a second-column and a center of a second connection pattern among the plurality of connection patterns disposed at the first-row and an ((N-1)-th)-column, a second straight line is defined as a line extending across the sensing area and passing through a center of a third connection pattern among the plurality of connection patterns disposed at a (M-th)-row and the second-column and a center of a fourth connection pattern among the plurality of connection patterns disposed at the (M-th)-row and the ((N-1)-th)-column, a third straight line is defined as a line extending across the sensing area and passing through a center of a fifth connection pattern among the plurality of connection patterns disposed at a second-row and a first-column and a center of a sixth connection pattern among the plurality of connection patterns disposed at a ((M-1)-th)-row and the first-column, and a fourth straight line is defined as a line extending across the sensing area and passing through a center of a seventh connection pattern among the plurality of connection patterns disposed at the second-row and an (N-th)-column and a center of an eighth connection pattern among the plurality of connection patterns disposed at the ((M-1)-th)-row and the (N-th)-column, and
a first cross point at which the first straight line and the third straight line cross each other, a second cross point at which the first straight line and the fourth straight line cross each other, a third cross point at which the second straight line and the third straight line cross each other, and a fourth cross point at which the second straight line and the fourth straight line cross each other do not overlap in plan view with outer connection patterns among the plurality of connection patterns disposed at each of a first-row and first-column, a first-row and (N-th)-column, a (M-th)-row and first column, and a (M-th)-row and (N-th)-column.

20. The electronic device of claim 19, wherein
a boundary between the sensing area and the surrounding area comprises a rounded boundary,
the rounded boundary is adjacent to at least one of the first cross point, the second cross point, the third cross point, or the fourth cross point, and the outer connection patterns, which are disposed at the first-row and first-column, the first-row and (N-th)-column, the (M-th)-row and first column, and the (M-th)-row and (N-th)-column, are respectively disposed to be spaced apart from each other in a direction that is away from the first to fourth cross points with respect to the rounded boundary.

* * * * *